(12) United States Patent
Furuki et al.

(10) Patent No.: US 7,557,970 B2
(45) Date of Patent: Jul. 7, 2009

(54) HOLOGRAM RECORDING METHOD, HOLOGRAM RECORDING DEVICE, HOLOGRAM PLAYBACK METHOD, AND OPTICAL RECORDING MEDIUM

(75) Inventors: Makoto Furuki, Kanagawa (JP); Katsunori Kawano, Kanagawa (JP); Shin Yasuda, Kanagawa (JP); Jiro Minabe, Kanagawa (JP); Koichi Haga, Kanagawa (JP); Yasuhiro Ogasawara, Kanagawa (JP); Kazuhiro Hayashi, Kanagawa (JP); Hisae Yoshizawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 351 days.

(21) Appl. No.: 11/493,611

(22) Filed: Jul. 27, 2006

(65) Prior Publication Data

US 2007/0195388 A1    Aug. 23, 2007

(30) Foreign Application Priority Data

Feb. 21, 2006    (JP) ............................. 2006-044222

(51) Int. Cl.
*G03H 1/12* (2006.01)

(52) U.S. Cl. .............................. 359/11; 359/21; 359/28; 359/900

(58) Field of Classification Search ........................ None
See application file for complete search history.

(56) References Cited

U.S. PATENT DOCUMENTS

| | | | |
|---|---|---|---|
| 6,040,930 A | 3/2000 | Heanue et al. | |
| 2004/0190094 A1* | 9/2004 | Kawano et al. | ............... 359/11 |
| 2005/0002311 A1 | 1/2005 | Ichihara et al. | |

FOREIGN PATENT DOCUMENTS

| | | |
|---|---|---|
| EP | 1 324 322 A1 | 7/2003 |
| EP | 1 351 226 A1 | 10/2003 |
| EP | 1 624 451 A1 | 2/2006 |
| JP | A 10-124872 | 5/1998 |
| JP | A-11-237829 | 8/1999 |
| JP | A-2005-241674 | 9/2005 |

(Continued)

OTHER PUBLICATIONS

"Natural number." Wikipedia, The Free Encyclopedia. Oct. 31, 2008, 10:52 UTC. Oct. 31, 2008 <http://en.wikipedia.org/w/index.php?title=Natural_number&oldid=248793633>.*
Horimai, H., et al., "Collinear Holography," Applied Optics, vol. 44, No. 13, pp. 2575-2579 (2005).
Pedrotti, F., et al., "Excerpt," Introduction to Optics, $2^{nd}$ Edition, pp. 561-562 (1993).

*Primary Examiner*—Stephone B Allen
*Assistant Examiner*—Derek S Chapel
(74) *Attorney, Agent, or Firm*—Oliff & Berridge, PLC

(57) ABSTRACT

A hologram recording method, which records signal light onto an optical recording medium as a hologram, includes: placing a signal light region, which generates signal light, and a reference light region, which generates reference light, symmetrically with respect to an optical axis of coherent light by displaying, on a spatial light modulator which spatially modulates the incident coherent light, a pattern which divides a modulating region into a plurality of regions; generating signal light and reference light by modulating the incident coherent light by the spatial light modulator; simultaneously and coaxially illuminating, onto a reflecting-type optical recording medium, the signal light and the reference light generated from the signal light region and the reference light region disposed symmetrically to one another; and recording the signal light on the optical recording medium as a hologram.

17 Claims, 9 Drawing Sheets

FOREIGN PATENT DOCUMENTS

| | | |
|---|---|---|
| JP | A-2005-292687 | 10/2005 |
| JP | A-2006-343368 | 12/2006 |
| WO | WO 2004/102542 A1 | 11/2004 |
| WO | WO 2007/043451 A1 | 4/2007 |

\* cited by examiner

HOLOGRAM RECORDING METHOD, HOLOGRAM RECORDING DEVICE, HOLOGRAM PLAYBACK METHOD, AND OPTICAL RECORDING MEDIUM

BACKGROUND

1. Technical Field

The present invention relates to a hologram recording method, a hologram recording device, a hologram playback method, and an optical recording medium. In particular, the present invention relates to a hologram recording method and device which illuminate signal light and reference light coaxially onto a reflecting-type optical recording medium and record a hologram, a hologram playback method which plays-back a hologram recorded by this method, and an optical recording medium used in recording a hologram by this method.

2. Related Art

A method has been proposed of manufacturing a transmitting-type hologram by illuminating signal light and reference light coaxially from the same surface side of a recording medium. In this method, signal light and reference light, which are generated from spatially different positions of a spatial light modulator, are Fourier-transformed by a lens. Because the Fourier-transformed signal light and reference light overlap in a vicinity of the Fourier transform plane, a hologram can be recorded by placing a recording medium at that position. Further, in this method, because the signal light and the reference light are illuminated coaxially, the optical system is simple, and the recording device can be made to be compact.

However, coaxial recording of a transmitting-type hologram has the problem that the spatial overlapping of the signal light and the reference light is small. In particular, if the film thickness of the recording material is large, there is the problem that, the further away from the Fourier transform plane in the optical axis direction, the smaller the region where the signal light and the reference light overlap, and a hologram cannot be recorded in the entire optical axis direction (thickness direction) of the recording material.

SUMMARY

An aspect of the present invention is a hologram recording method including: placing a signal light region, which generates signal light, and a reference light region, which generates reference light, symmetrically with respect to an optical axis of coherent light by displaying, on a spatial light modulator which spatially modulates the incident coherent light, a pattern which divides a modulating region into plural regions; generating signal light and reference light by modulating the incident coherent light by the spatial light modulator; simultaneously and coaxially illuminating, onto a reflecting-type optical recording medium, the signal light and the reference light generated from the signal light region and the reference light region disposed symmetrically to one another; and recording the signal light on the optical recording medium as a hologram.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail hereinafter with reference to the drawings.

(Principles of Hologram Recording/Playback)

Figure 1:
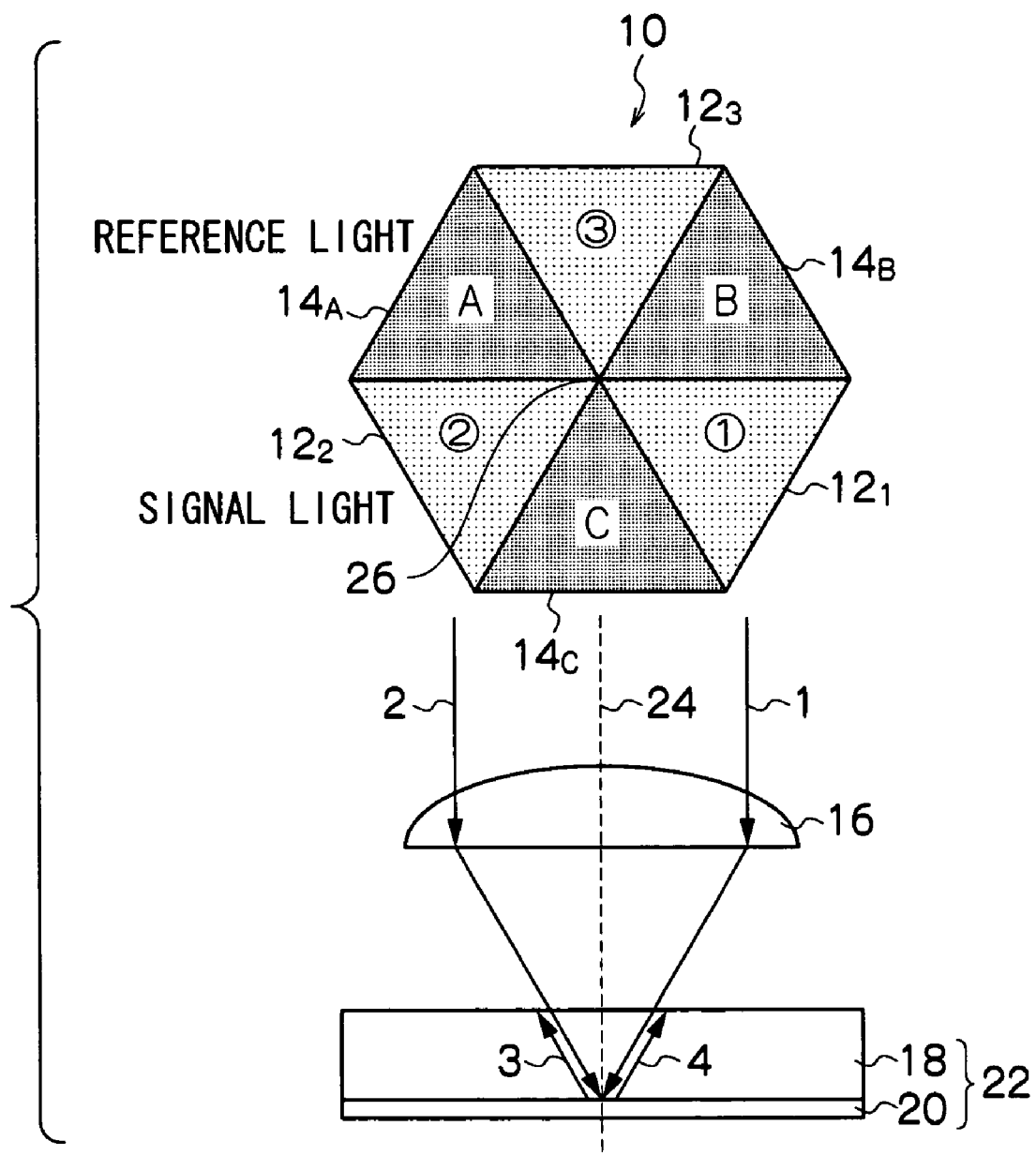
FIG. 1 is a drawing explaining the principles of hologram recording of the present invention.

FIG. 1 is a diagram explaining the principles of hologram recording of the present invention.

As shown in FIG. 1, at the time of recording a hologram, a recording light pattern 10, which is a substantially regular hexagon which is a modulating region for spatially modulating coherent light which passes through a spatial light modulator (not shown), is displayed on the spatial light modulator. The recording light pattern 10 is divided into a total of six regions, which are three signal light regions $12_1$, $12_2$, $12_3$ which generate signal light, and three reference light regions $14_A$, $14_B$, $14_C$ which generate reference light. All of these six regions have the same shape (substantially equilateral triangle shapes in FIG. 1). The recording light pattern 10 is structured from three groups of regions, the signal light region $12_1$ and the reference light region $14_A$, the signal light region $12_2$ and the reference light region $14_B$, and the signal light region $12_3$ and the reference light region $14_C$, which are disposed symmetrically with respect to a central point 26 which an optical axis 24 of the coherent light passes through.

Note that, when there is no need to distinguish between the respective signal light regions, the three signal light regions $12_1$, $12_2$, $12_3$ are collectively called signal light regions 12. When there is no need to distinguish between the respective reference light regions, the three reference light regions $14_A$, $14_B$, $14_C$ are collectively called reference light regions 14.

Explanation will be given here of a case in which signal light generated from the signal light region $12_1$ and reference light generated from the reference light region $14_A$ are collected at a same lens 16 and are illuminated onto an optical recording medium 22. The optical recording medium 22 is a reflecting-type optical recording medium having a recording layer 18 at which a hologram can be recorded by changes in the refractive index corresponding to the light intensity distribution, and a reflecting layer 20 which reflects the signal light and reference light which pass through the recording layer 18. The lens 16 is disposed such that the beam waists of the signal light and the reference light are positioned at the surface of the reflecting layer 20.

The signal light generated from the signal light region $12_1$ is collected at the lens 16 and is incident on the optical recording medium 22. Incident signal light 1 which passes through the recording layer 18 is reflected at the reflecting layer 20 and becomes reflected signal light 3. On the other hand, the reference light generated from the reference light region $14_A$ is collected at the lens 16 and is incident on the optical recording medium 22. Incident reference light 2 which passes through the recording layer 18 is reflected at the reflecting layer 20 and becomes reflected reference light 4. The incident signal light 1 and reflected reference light 4 interfere in facing directions, and the interference stripes thereof are recorded as a first hologram. The reflected signal light 3 and the incident reference light 2 interfere in facing directions, and the interference stripes thereof are recorded as a second hologram.

Because the incident signal light 1 and the incident reference light 2 are divided spatially, in the same advancing direction, they do not overlap other than at the beam waists, and because interference does not arise within the recording layer 18, there is very little unnecessary exposure. In contrast, the incident signal light 1 and the reflected reference light 4, and the reflected signal light 3 and the incident reference light 2 completely overlap in the reverse direction. Therefore, a hologram can be recorded in the entire optical axis direction (thickness direction) of the recording layer 18, the thickness of the medium can be utilized effectively, and high-density recording at the volume hologram is possible.

Further, also with respect to the combination of the signal light generated from the signal light region $12_2$ and the reference light generated from the reference light region $14_B$, and the combination of the signal light generated from the signal light region $12_3$ and the reference light generated from the reference light region $14_C$, the signal light and the reference light interfere in facing directions, and two types of interference stripes are recorded as a hologram.

Figure 2:
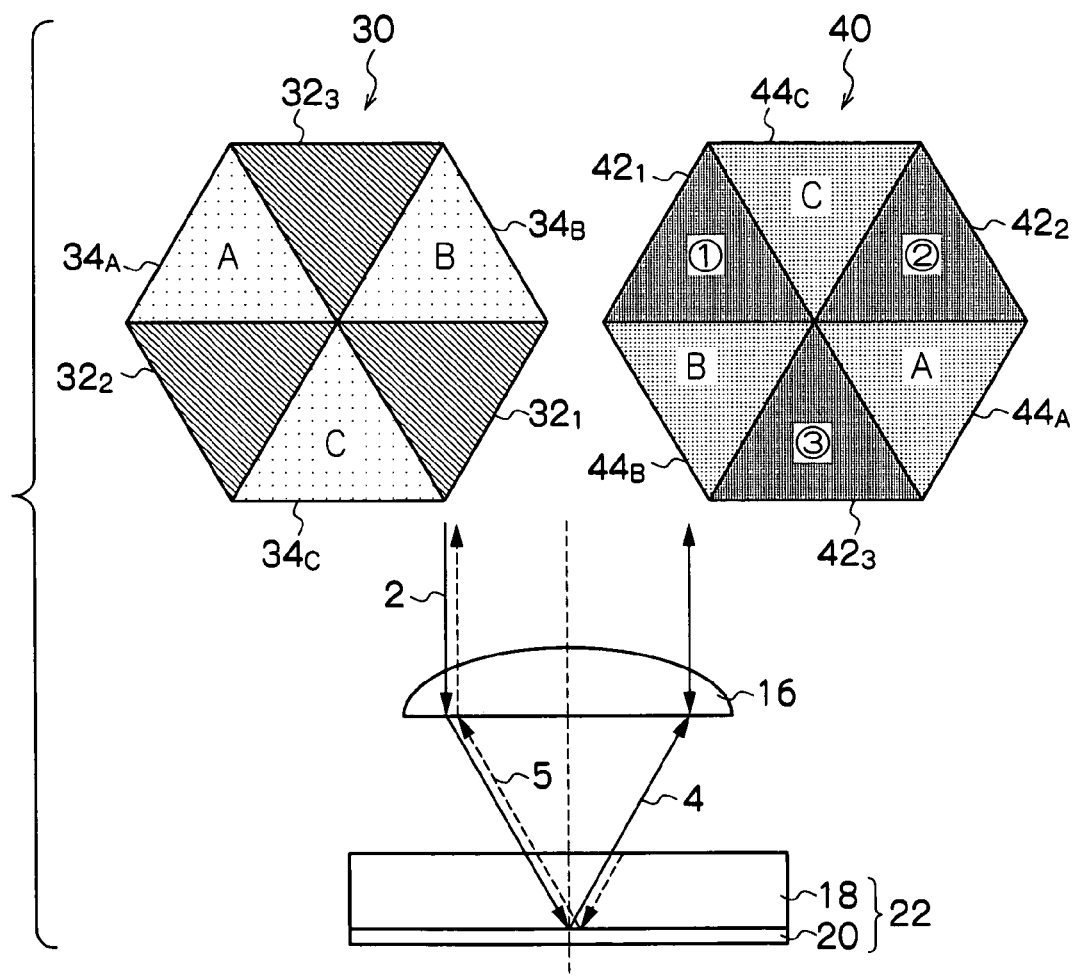
FIG. 2 is a drawing explaining the principles of hologram playback of the present invention.

FIG. 2 is a drawing explaining the principles of hologram playback of the present invention.

In the above description, explanation is given of an example in which a hologram is recorded due to the signal light and the reference light generated from the signal light region $12_1$ and the reference light region $14_A$, which are disposed symmetrically to one another, being simultaneously and coaxially illuminated onto the reflecting-type optical recording medium 22. Explanation will be given next of a method of playing-back the hologram recorded by the above-described method.

As shown in FIG. 2, at the time of playing-back a hologram, a read-out light pattern 30, which is a substantially regular hexagon which is a modulating region for spatially modulating coherent light which passes through, is displayed on a spatial light modulator (not shown). The read-out light pattern 30 is divided into a total of six regions, which are three light-blocking regions $32_1$, $32_2$, $32_3$, and three reference light regions $34_A$, $34_B$, $34_C$ which generate reference light. All of these six regions have the same shape (substantially equilateral triangle shapes in FIG. 2). The read-out light pattern 30 is structured from three groups of regions, the light-blocking region $32_1$ and the reference light region $34_A$, the light-blocking region $32_2$ and the reference light region $34_B$, and the light-blocking region $32_3$ and the reference light region $34_C$, which are disposed symmetrically with respect to the central point 26 which the optical axis 24 of the coherent light passes through.

The three light-blocking regions $32_1$, $32_2$, $32_3$ provided at the read-out light pattern 30 respectively have the same configurations as the signal light regions $12_1$, $12_2$, $12_3$ of the recording light pattern 10, and are disposed at the same positions as the corresponding signal light regions $12_1$, $12_2$, $12_3$ of the recording light pattern 10. The three reference light regions $34_A$, $34_B$, $34_C$ provided at the read-out light pattern 30 respectively have the same configurations as the reference light regions $14_A$, $14_B$, $14_C$ of the recording light pattern 10, and are disposed at the same positions as the corresponding reference light regions $14_A$, $14_B$, $14_C$ of the recording light pattern 10.

Explanation will be given of a case in which reference light generated from the reference light region $34_A$ is collected at the lens 16, and is illuminated onto the optical recording medium 22 as read-out light. The reference light generated from the reference light region $34_A$ is collected at the lens 16, is incident on the optical recording medium 22, and is diffracted by the recorded hologram. Diffracted light 5 is propagated in the opposite direction as the incident reference light 2, and exits from the optical recording medium 22. In this way, the signal light generated from the signal light region $12_1$ is played-back.

Similarly, the signal light generated from the signal light region $12_2$ is played-back by illuminating, onto the optical recording medium 22, the reference light generated from the reference light region $34_B$. Moreover, the signal light generated from the signal light region $12_3$ is played-back by illuminating, onto the optical recording medium 22, the reference light generated from the reference light region $34_C$. On the other hand, the incident reference light 2 which passes through the recording layer 18 is reflected at the reflecting layer 20 and becomes the reflected reference light 4. The diffracted light 5 and the reflected reference light 4 are imaged on a light detector (not shown), and are observed as a playback image 40.

In the playback image 40, a pattern $42_1$ of the signal light region $12_1$ is played-back at the position of the reference light region $34_A$ of the read-out light pattern 30. Further, in the playback image 40, a pattern $44_A$ of the reference light region $34_A$ by the reflected reference light 4 is imaged at the position of the light-blocking region $32_1$ of the read-out light pattern 30. Similarly, a pattern $42_2$ of the signal light region $12_2$ is played-back at the position of the reference light region $34_B$, and a pattern $42_3$ of the signal light region $12_3$ is played-back at the position of the reference light region $34_C$. Further, a pattern $44_B$ of the reference light region $34_B$ is imaged at the position of the light-blocking region $32_2$, and a pattern $44_C$ of the reference light region $34_C$ is imaged at the position of the light-blocking region $32_3$.

Figure 3:
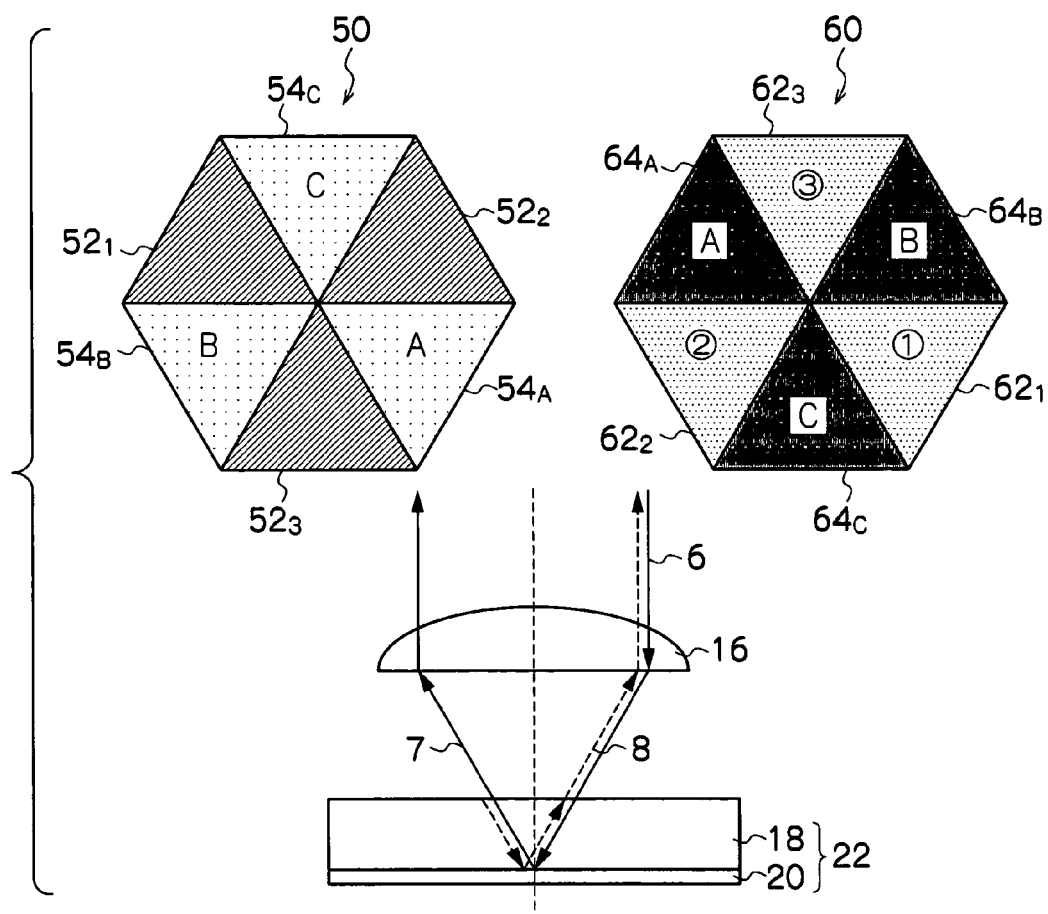
FIG. 3 is a drawing explaining a hologram playback method in accordance with phase conjugation.

FIG. 3 is a drawing explaining a hologram playback method in accordance with phase conjugation.

As shown in FIG. 3, at the time of playing-back a hologram, a read-out light pattern 50, which is a substantially regular hexagon which is a modulating region for spatially modulating coherent light which passes through, is displayed on a spatial light modulator (not shown). The read-out light pattern 50 is divided into a total of six regions, which are three light-blocking regions $52_1$, $52_2$, $52_3$, and three reference light regions $54_A$, $54_B$, $54_C$ which generate reference light. All of these six regions have the same shape (substantially equilateral triangle shapes in FIG. 3). The read-out light pattern 50 is structured from three groups of regions, the light-blocking region $52_1$ and the reference light region $54_A$, the light-blocking region $52_2$ and the reference light region $54_B$, and the light-blocking region $52_3$ and the reference light region $54_C$, which are disposed symmetrically with respect to the central point 26 which the optical axis 24 of the coherent light passes through.

The three light-blocking regions $52_1$, $52_2$, $52_3$ provided at the read-out light pattern 50 respectively have the same configurations as the reference light regions $14_A$, $14_B$, $14_C$ of the recording light pattern 10, and are disposed at the same positions as the corresponding reference light regions $14_A$, $14_B$, $14_C$ of the recording light pattern 10. The three reference light regions $54_A$, $54_B$, $54_C$ provided at the read-out light pattern 50 respectively have the same configurations as the signal light regions $12_1$, $12_2$, $12_3$ of the recording light pattern 10, and are disposed at the same positions as the corresponding signal light regions $12_1$, $12_2$, $12_3$ of the recording light pattern 10.

Explanation will be given of a case in which the reference light generated from the reference light region $54_A$ is collected at the lens 16 and is illuminated onto the optical recording medium 22 as read-out light. Reference light 6 generated from the reference light region $54_A$ is collected at the lens 16, is incident on the optical recording medium 22, and is diffracted by the recorded hologram. Diffracted light 8 propagates in the direction opposite the incident reference light 6, and exits from the optical recording medium 22. In this way, the signal light generated from the signal light region $12_1$ is played-back.

Similarly, the signal light generated from the signal light region $12_2$ is played-back due to the reference light generated from the reference light region $54_B$ being illuminated onto the optical recording medium 22. Further, the signal light generated from the signal light region $12_3$ is played-back due to the reference light generated from the reference light region $54_C$ being illuminated onto the optical recording medium 22. On the other hand, the incident reference light 6 which passes through the recording layer 18 is reflected at the reflecting layer 20 and becomes reflected reference light 7. The diffracted light 8 and the reflected reference light 7 are imaged onto a light detector (not shown), and a playback image 60 is observed.

In the playback image 60, a pattern $62_1$ of the signal light region $12_1$ is played-back at the position of the reference light region $54_A$ of the read-out light pattern 50. Further, in the playback image 40, a pattern $64_A$ of the reference light region $54_A$ by the reflected reference light 7 is imaged at the position of the light-blocking region $52_1$ of the read-out light pattern 30. Similarly, a pattern $62_2$ of the signal light region $12_2$ is played-back at the position of the reference light region $54_B$, and a pattern $62_3$ of the signal light region $12_3$ is played-back at the position of the reference light region $54_C$. Further, a pattern $64_B$ of the reference light region $54_B$ is imaged at the position of the light-blocking region $52_2$, and a pattern $64_C$ of the reference light region $54_C$ is imaged at the position of the light-blocking region $52_3$.

As described above, the hologram, which is recorded by simultaneously and coaxially illuminating onto the reflecting-type optical recording medium 22 the signal light and the reference light generated from the signal light regions 12 and the reference light regions which are disposed symmetrically to one another, can be played-back by two methods.

(Modified Examples of Recording Light Pattern)

Figure 4A:
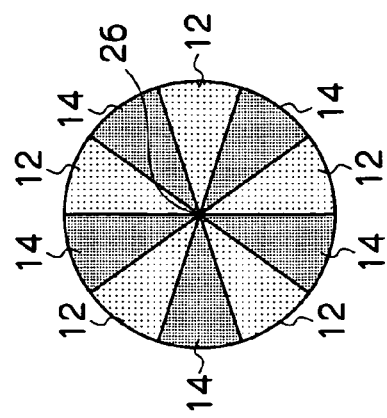
FIGS. 4A through 4D are drawings showing modified examples of a recording light pattern.
Figure 4B:
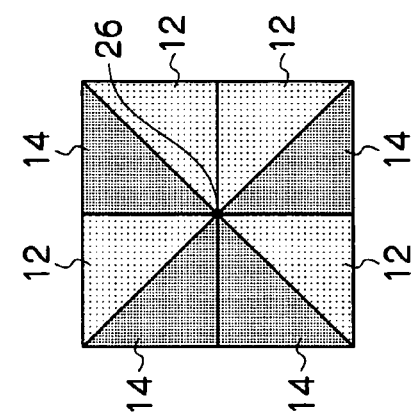

Explanation is given above of an example in which a substantially regular hexagonal recording light pattern is divided into six regions, and the respective regions are assigned to signal light regions and reference light regions. However, it suffices for the signal light regions and the reference light regions to be able to be disposed symmetrically with respect to the optical axis of the coherent light, and the configuration and number of divisions of the recording light pattern which is the modulating region, and the arrangement of the signal light regions and the reference light regions are not limited to those of the above-described example. FIGS. 4A through 4D are diagrams showing modified examples of the recording light pattern. For example, as shown in FIG. 4A, a substantially square recording light pattern can be divided in two with respect to the central point 26, and one region made to be the signal light region 12 and the other region made to be the reference light region 14. Further, as shown in FIG. 4B, a substantially square recording light pattern can be divided in four with respect to the central point 26, and two regions made to be the signal light regions 12 and the remaining two regions made to be the reference light regions 14.

Figure 4C:
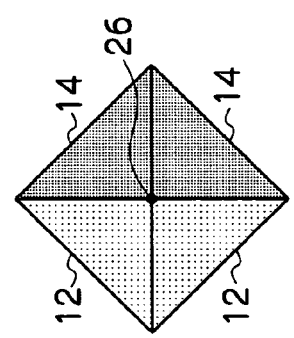
Figure 4D:
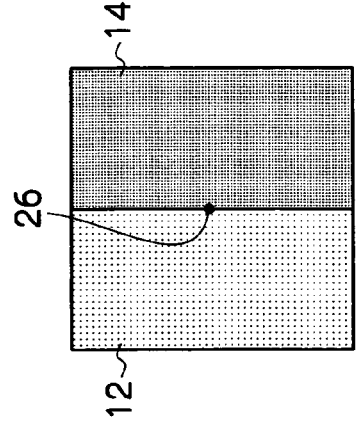

Or, as shown in FIG. 4C, a substantially square recording light pattern can be divided into eight regions with respect to the central point 26, and four regions made to be the signal light regions 12 and the remaining four regions made to be the reference light regions 14. Further, the recording light pattern is not limited to rectangular shapes such as squares or the like. Other than polygons such as hexagons, octagons, and the like, fan-shapes or circles may be used. As shown in FIG. 4D, a recording light pattern which is a substantially perfect circle can be divided into 10 regions with respect to the central point 26, and five regions made to be the signal light regions 12 and the remaining five regions made to be the reference light regions 14.

As described above, the number of divisions is an even number as a matter of course. However, when the recording light pattern is divided into a number of regions divisible by four, such as divided by four or divided by eight or the like, reference light regions are adjacent to one another. As a result, the recording light pattern is the same as if divided into a smaller number of divisions, such as four divisions is the same as two divisions, and eight divisions is the same as six divisions. Accordingly, it is preferable to divide the recording light pattern into a number of regions which is an even number not divisible by four such as, for example, 2, 6, 10, 14, . . . 102, and the like, i.e., to divide the recording light pattern into 4n+2 regions (where n is 0 or a natural number).

Figure 5:
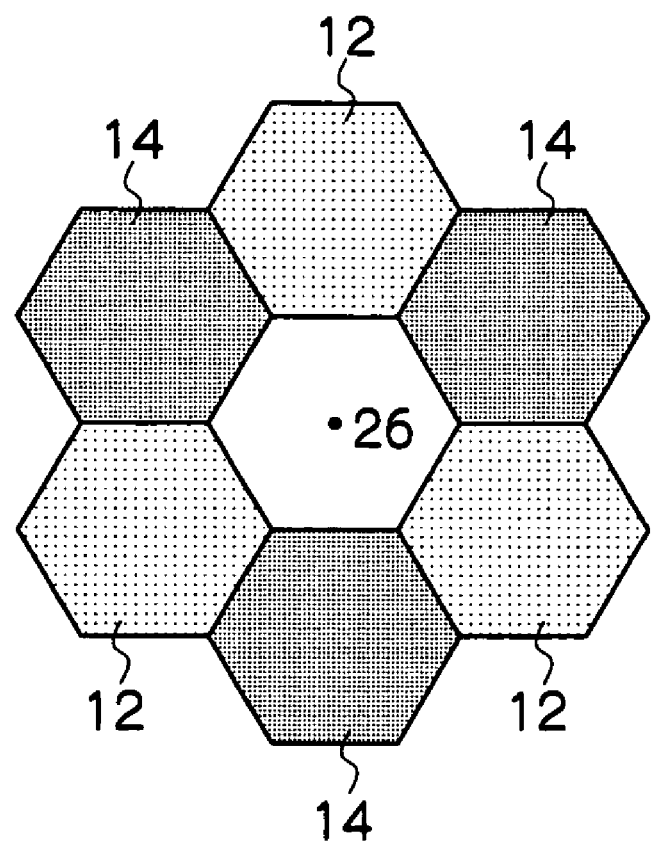
FIG. 5 is a drawing showing a modified example of a recording light pattern.

Further, as shown in FIG. 5, the signal light regions 12 and the reference light regions 14 can be disposed so as to be apart from the central point 26 (the optical axis 24). When the signal light region 12 and the reference light region 14, which are disposed symmetrically to one another with respect to the central point 26, are adjacent, the signal light and the reference light interfere in the same advancing direction, and unnecessary exposure occurs. By disposing the signal light region 12 and the reference light region 14, which are disposed symmetrically to one another, away from the optical axis 24, such unnecessary exposure can be prevented.

Figure 6:
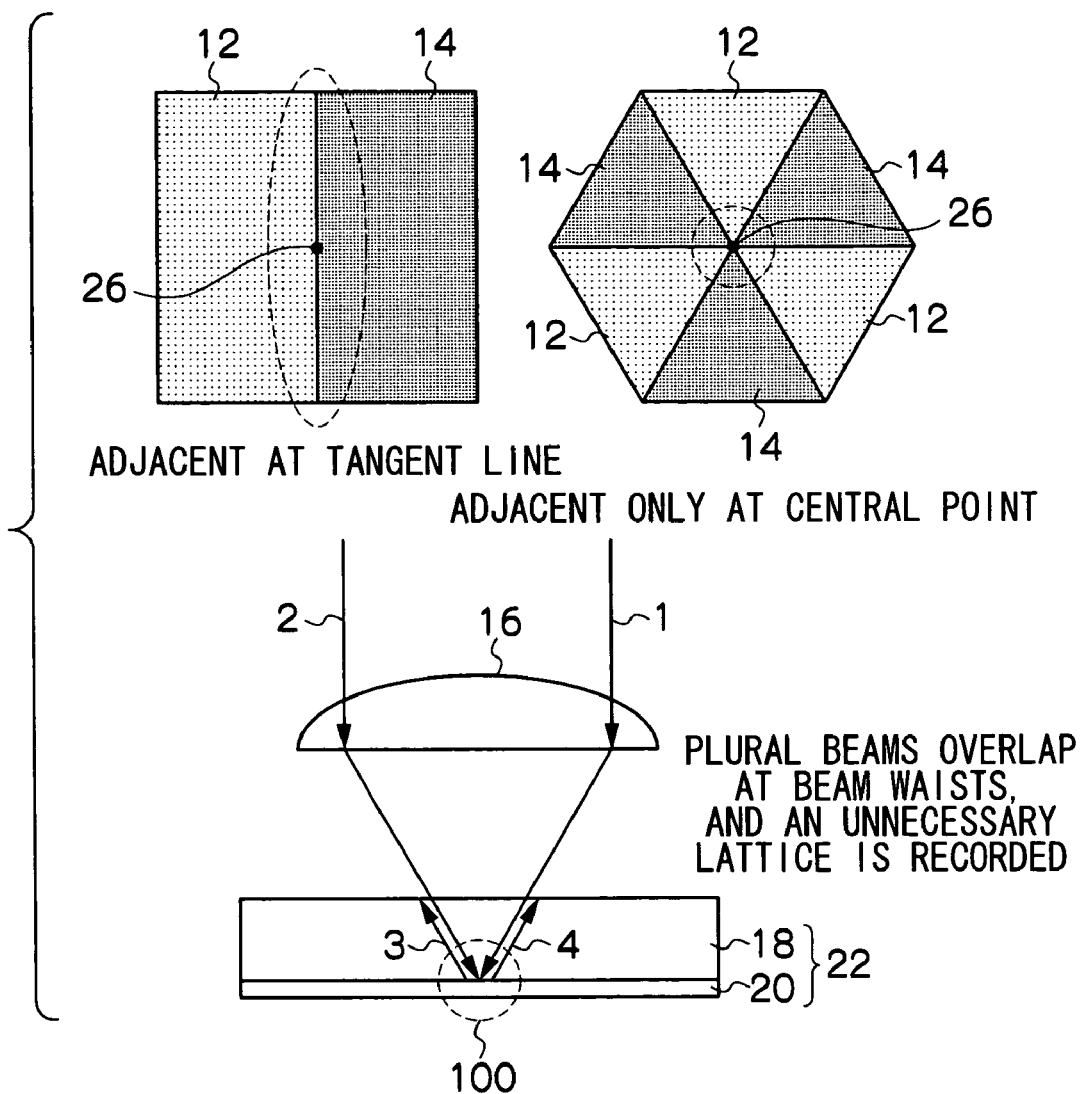
FIG. 6 is a drawing showing signal light regions and reference light regions disposed near to one another.
Figure 7:
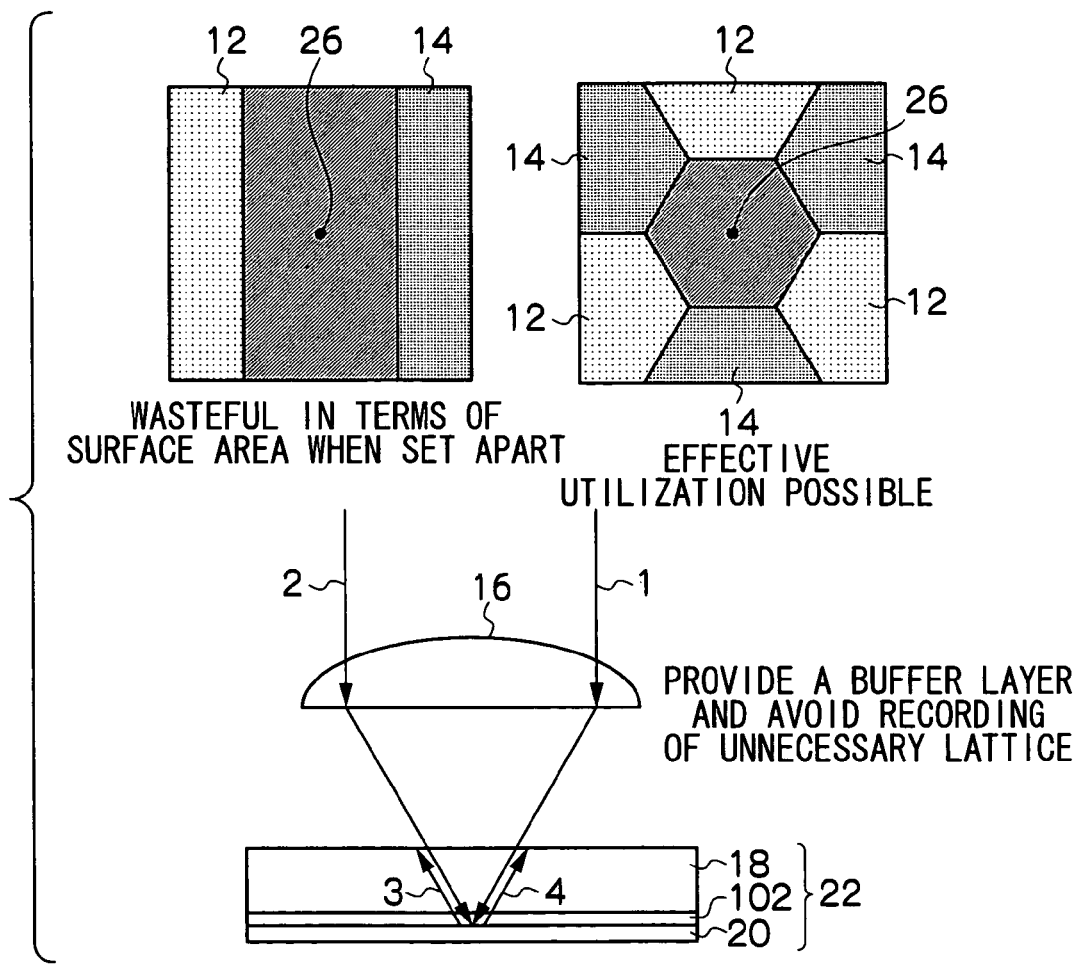
FIG. 7 is a drawing showing the signal light regions and the reference light regions disposed apart from one another.

Further, it is preferable that the number of divisions is 6 or more, i.e., 4n+2 (where n is a natural number). The reason for this will be explained with reference to FIGS. 6 and 7. If the recording light pattern is divided in two, as shown in FIG. 6, the signal light region 12 and the reference light region 14, which are disposed symmetrically to one another with respect to the central point 26, are adjacent at a tangent line, and noise arises easily because the angles of incidence are close. If the signal light region 12 and the reference light region 14 are disposed apart from one another in order to avoid this problem as shown in FIG. 7, it is wasteful in terms of the modulating region (spatial region) of the spatial light modulator. In contrast, if there are six or more divisions, as shown in FIG. 6, the signal light region 12 and the reference light region 14, which are disposed symmetrically to one another with respect to the central point 26, are apart from one another and only contact at the central point 26. Therefore, it is difficult for noise to arise, and the spatial regions can be utilized effectively.

(Preferable Layer Structure of Optical Recording Medium)

As described with reference to FIG. 1, in the present invention, because the incident signal light 1 and the incident reference light 2 are divided spatially, they do not overlap other than at the beam waists in the same advancing direction, and interference does not occur within the recording layer 18. Therefore, there is very little unnecessary exposure. However, as shown in FIG. 6, at a beam waist 100, all of the beams of the incident signal light 1, the incident reference light 2, the reflected signal light 3 and the reflected reference light 4 overlap, and there is the possibility that an unnecessary lattice which is written at that time will become a source of noise.

In order to overcome this problem, as shown in FIG. 7, it is preferable to provide a buffer layer 102, which is structured of a material which is inactive with respect to the recording light which is formed from signal light and reference light, between the recording layer 18 and the reflecting layer 20 of the optical recording medium 22. By providing the buffer layer 102, the recording layer 18 and the reflecting layer 20 can be made to be apart from one another so that the beam waists are not positioned within the recording layer 18. In this way, writing of an unnecessary lattice to the recording layer 18 can be prevented.

FIRST EXEMPLARY EMBODIMENT

Figure 8:
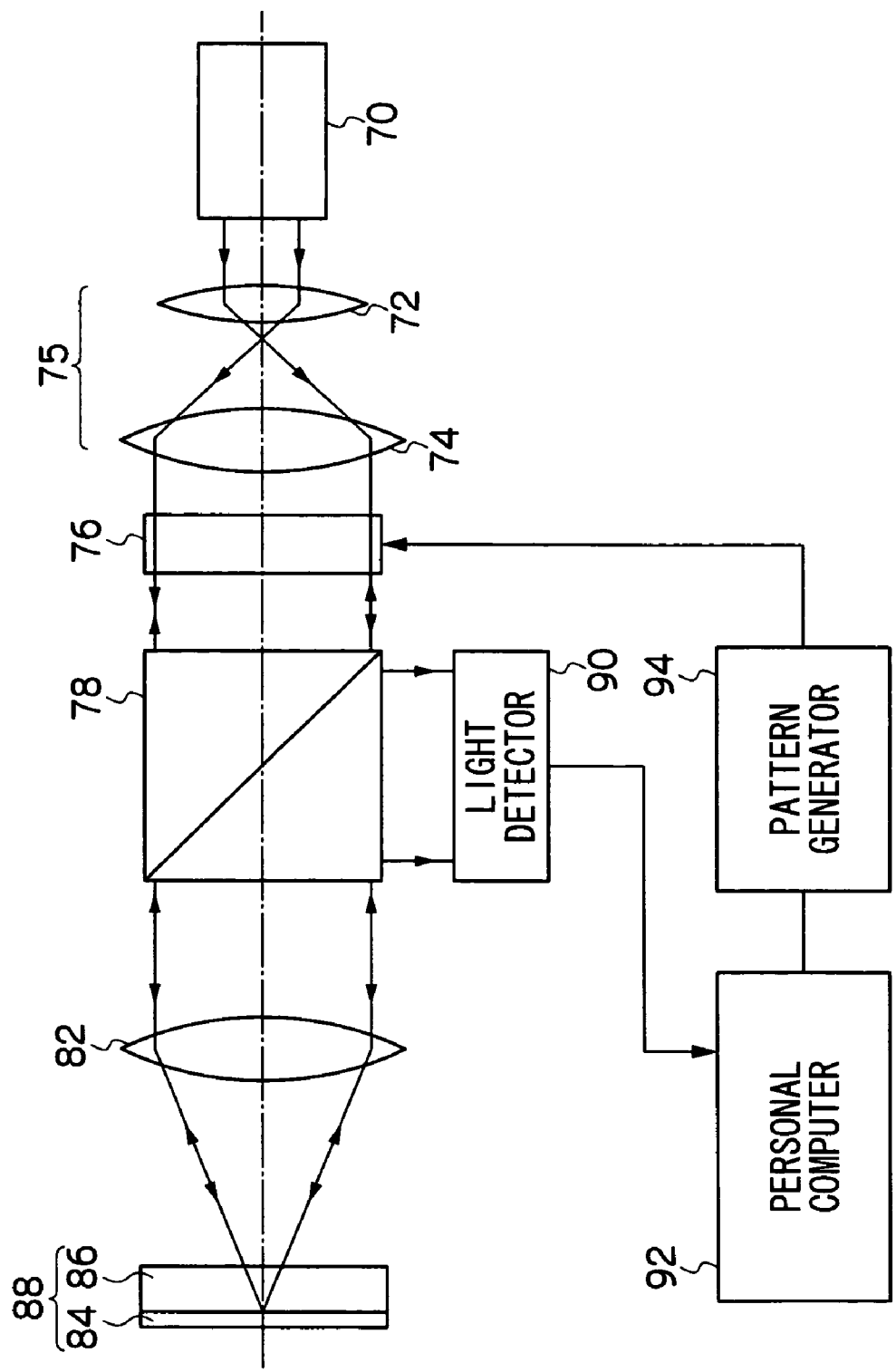
FIG. 8 is schematic structural view of a hologram recording/playback device relating to a first exemplary embodiment of the present invention.

FIG. 8 is a schematic structural view of a hologram recording/playback device relating to an exemplary embodiment of the present invention. As shown in FIG. 8, in this recording/playback device, signal light and reference light can be illuminated coaxially onto an optical recording medium.

A light source 70, which oscillates laser light which is coherent light, is provided at the hologram recording/playback device. A beam expander 75, which is formed from lenses 72, 74, is disposed at the laser light illuminating side of the light source 70. A transmitting-type spatial light modulator 76 is disposed at the light transmitting side of the beam expander 75.

The spatial light modulator 76 is connected to a personal computer 92 via a pattern generator 94. In accordance with digital data supplied from the personal computer 92, the pattern generator 94 generates a pattern to be displayed on the spatial light modulator 76. The spatial light modulator 76 modulates incident laser light in accordance with the displayed pattern, and generates a digital image (signal light) and reference light per page.

A beam splitter 78, which transmits half of the light intensity and reflects the remaining half, is disposed at the light transmitting side of the spatial light modulator 76. The signal light and reference light generated at the spatial light modulator 76 exit in the direction of the beam splitter 78, and half of the light intensity is transmitted through the beam splitter 78.

A Fourier transform lens 82 is disposed at the signal light transmitting side of the beam splitter 78. The Fourier transform lens 82 illuminates, onto a reflecting-type optical recording medium 88 having a reflecting layer 84 and a recording layer 86, the signal light and reference light from the recording layer 86 side.

A light detector 90, which is structured by an image pickup element such as a CCD or a CMOS array or the like and which converts received playback light (diffracted light) into electric signals and outputs the electric signals, is disposed at the diffracted light reflecting side of the beam splitter 78. The light detector 90 is connected to the personal computer 92. When reference light is illuminated onto the optical recording medium 88 at the time of playing-back the hologram, a portion of the illuminated reference light is diffracted in the reverse direction by the hologram. Further, the portion of the reference light which passes through the recording layer 86 and is reflected by the reflecting layer 84 of the optical recording medium 88, is diffracted by the hologram, and is again reflected by the reflecting layer 84, and the both diffracted lights are played-back in the direction of the Fourier transform lens 82. The played-back diffracted lights are incident on the beam splitter 78, and diffracted light of half of the light intensity is reflected in the direction of the light detector 90.

Figure 9:
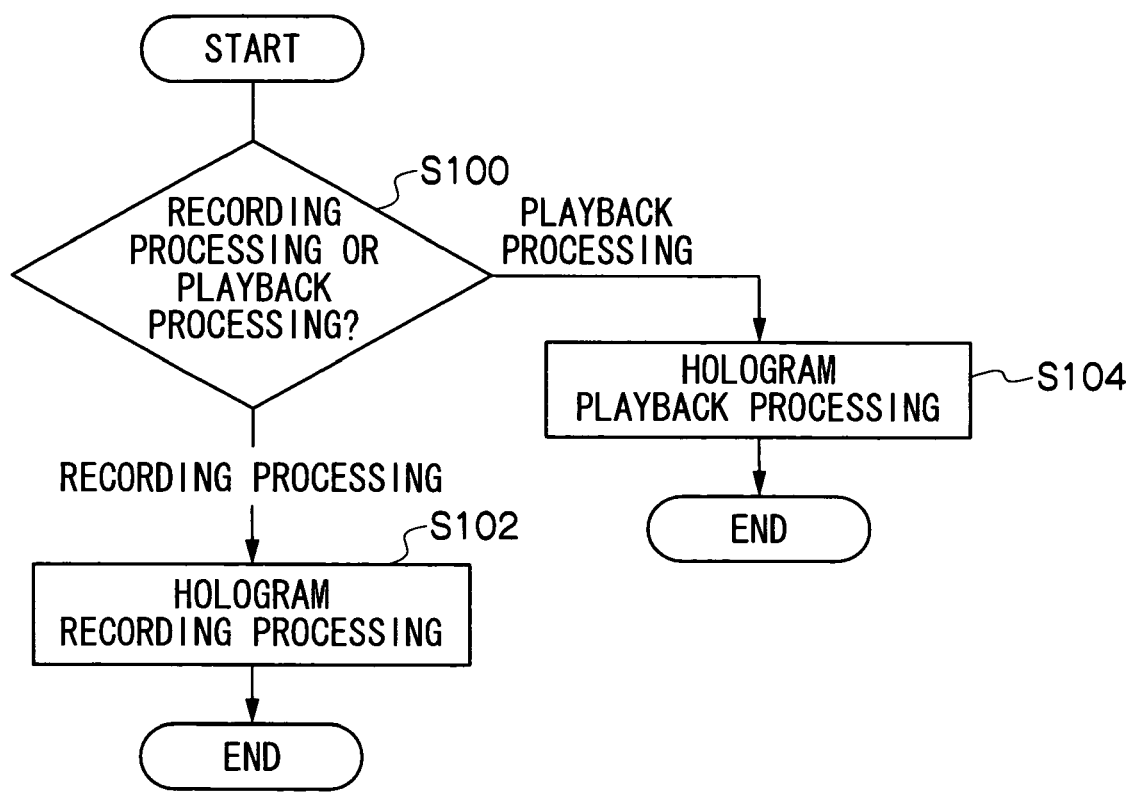
FIG. 9 is a flowchart showing a processing routine of recording/playback processing.

A processing routine of the recording/playback processing, which is executed by the personal computer 92, will be described next. FIG. 9 is a flowchart showing the processing routine of the recording/playback processing. First, a user operates an input device (not shown) and selects recording processing or playback processing. In a case in which digital data is to be recorded as a hologram, the digital data to be recorded is inputted in advance to the personal computer.

In step 100, it is judged whether recording processing is selected or playback processing is selected. If recording processing is selected, in step 102, laser light is illuminated from the light source 70, digital data is outputted at a predetermined time from the personal computer 92, recording processing of a hologram is carried out, and then the routine ends.

Here, recording processing of the hologram will be described.

The laser light oscillated from the light source 70 is collimated into a large-diameter beam by the beam expander 75, and is incident on the spatial light modulator 76. When digital data is inputted from the personal computer 92, at the pattern generator 94, a signal light pattern is generated in accordance with the supplied digital data, the signal light pattern is combined with a reference light pattern, and a pattern to be displayed on the spatial light modulator 76 is generated. At the spatial light modulator 76, the laser light is intensity-modulated in accordance with the displayed pattern, and signal light and reference light are generated.

In the present exemplary embodiment, as shown in FIG. 1, the recording light pattern 10, which is shaped as a substantially regular hexagon and which is divided into a total of six regions which are the three signal light regions $12_1$, $12_2$, $12_3$ and the three reference light regions $14_A$, $14_B$, $14_C$, is displayed on the spatial light modulator 76. The laser light incident on the spatial light modulator 76 is modulated in accordance with the displayed pattern, and signal light and reference light which are P-polarized light are generated.

The signal light and reference light which are modulated at the spatial light modulator 76 are illuminated onto the beam splitter 78, and half of the light intensity is transmitted through the beam splitter 78. Thereafter, the lights are Fourier-transformed by the lens 82, and are illuminated simultaneously and coaxially onto the optical recording medium 88. In this way, the signal light which is incident on the optical recording medium 88 and the reference light which is reflected at the reflecting layer 84, or the signal light reflected at the reflecting layer 84 and the incident reference light, overlap at the beam waists over the entire region of the recording layer 86 and interfere with one another, and the interference pattern is recorded as a reflecting-type hologram.

As described above, by disposing the signal light regions 12 and the reference light regions 14 symmetrical to one another in the displayed pattern of the spatial light modulator 76, the signal light and the reference light which are incident on the optical recording medium 88 are separated spatially, and do not overlap and do not cause interference other than at the beam waists in the same advancing direction. Therefore, there is very little unnecessary exposure.

If playback processing is selected in step 100 of FIG. 9, in step 104, laser light is illuminated from the light source 70, and playback processing of the hologram starts.

Here, the playback processing of the hologram will be described.

As shown in FIG. 2, the read-out light pattern 30, which is shaped as a substantially regular hexagon and which is divided into a total of six regions which are the three light-blocking regions $32_1$, $32_2$, $32_3$ and the three reference light regions $34_A$, $34_B$, $34_C$, is displayed on the spatial light modulator 76. The laser light which is incident on the spatial light modulator 76 is modulated in accordance with the displayed pattern, and reference light is generated. In this way, after the generated reference light is transmitted through the beam splitter 78, it is Fourier-transformed by the lens 82, and only the reference light is illuminated onto the region of the optical recording medium 88 where the hologram is recorded.

In the case of playback in accordance with phase conjugation as well, as shown in FIG. 3, the read-out light pattern 50, which is shaped as a substantially regular hexagon and is divided into a total of six regions which are the three light-blocking regions $52_1$, $52_2$, $52_3$ and the three reference light regions $54_A$, $54_B$, $54_C$, is displayed on the spatial light modulator 76. The laser light which is incident on the spatial light modulator 76 is modulated in accordance with the displayed pattern, and reference light which is P-polarized light is generated. In this way, after the generated reference light is transmitted through the beam splitter 78, it is Fourier-transformed by the lens 82, and only the reference light is illuminated onto the region of the optical recording medium 88 where the hologram is recorded.

In the present exemplary embodiment, the illuminated reference light is diffracted by the hologram, is inverse Fourier-transformed by the lens 82, is incident on the beam splitter 78, and is reflected in the direction of the light detector 90. The playback image can be observed at the focal plane of the lens 82.

This playback image is detected by the light detector 90. The detected analog data is A/D converted by the light detector 90. The image data of the playback image is inputted to the personal computer 92, and is held in a RAM (not shown). Binary digital data is decoded from this image data, and the routine ends. In this way, the digital data held in the signal light is decoded.

As described above, in the present exemplary embodiment, in a displayed pattern of a spatial light modulator, the modulating region is divided into plural regions, and signal light regions and reference light regions are disposed so as to be symmetrical to one another. In this way, the signal light and reference light which are incident on an optical recording medium are spatially divided, and, in the same advancing direction, do not overlap and do not cause interference other than at the beam waists. Therefore, the noise diffraction component due to unnecessary exposure can be made to be very small.

Further, in the displayed pattern of the spatial light modulator, by dividing the modulating region into plural regions and disposing the signal light regions and reference light regions so as to be symmetrical to one another, the incident signal light and the reflected reference light, or the reflected signal light and the incident reference light, completely overlap and cause interference in the reverse direction. Therefore, a hologram can be recorded in the entire optical axis direction (thickness direction) of the recording layer, the thickness of the optical recording medium can be utilized effectively, and high-density recording at a volume hologram is possible.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A hologram recording method comprising:
    placing a signal light region that generates signal light, and a reference light region that generates reference light, symmetrically to one another about an optical axis of coherent light by displaying, on a spatial light modulator that spatially modulates the incident coherent light, a pattern that divides a modulating region into a plurality of regions;
    generating signal light and reference light by modulating the incident coherent light by the spatial light modulator;
    simultaneously and coaxially illuminating, onto a reflecting-type optical recording medium, the signal light and the reference light generated from the signal light region and the reference light region disposed symmetrically to one another; and
    recording the signal light on the optical recording medium as a hologram, wherein the modulating region of the spatial light modulator is divided into 4n+2 regions, where n is a natural number greater than or equal to 1.

2. The hologram recording method of claim 1, wherein the signal light region and the reference light region are substantially equivalent shapes.

3. The hologram recording method of claim 1, wherein there are a plurality of the reference light regions, and a different pattern is displayed at each of the plurality of reference light regions.

4. The hologram recording method of claim 1, wherein the signal light region and the reference light region are disposed at positions that are apart from the optical axis.

5. The hologram recording method of claim 1, wherein the signal light region and the reference light region are disposed apart from one another.

6. The hologram recording method of claim 1, wherein there are a plurality of a group of the signal light region and the reference light region that are disposed symmetrically to one another, and by illuminating the generated signal light and reference light simultaneously and coaxially onto the optical recording medium for each group, the signal light of each group is successively recorded on the optical recording medium as a hologram.

7. A hologram recording device comprising:
    a light source that illuminates coherent light;
    a spatial light modulator that spatially modulates incident coherent light by pattern display, and generates signal light and reference light;
    a display controller that displays a pattern, which divides a modulating region into a plurality of regions, on the spatial light modulator so that a signal light region generating signal light and a reference light region generating reference light are disposed symmetrically to one another about an optical axis of the coherent light; and
    an optical system that simultaneously and coaxially illuminates, onto a reflecting-type optical recording medium, signal light and reference light respectively generated from the signal light region and the reference light region that are disposed symmetrically to one another, wherein the modulating region of the spatial light modulator is divided into 4n+2 regions, where n is a natural number greater than or equal to 1.

8. The hologram recording device of claim 7, wherein the signal light region and the reference light region are substantially equivalent shapes.

9. The hologram recording device of claim 7, wherein there are a plurality of the reference light regions, and a different pattern is displayed at each of the plurality of reference light regions.

10. The hologram recording device of claim 7, wherein the signal light region and the reference light region are disposed at positions that are apart from the optical axis.

11. The hologram recording device of claim 7, wherein the signal light region and the reference light region are disposed apart from one another.

12. The hologram recording device of claim 7, wherein there are a plurality of a group of the signal light region and the reference light region that are disposed symmetrically to one another, and by illuminating the generated signal light and reference light simultaneously and coaxially onto the optical recording medium for each group, the signal light of each group is successively recorded on the optical recording medium as a hologram.

13. A hologram playback method comprising:
providing a reflecting-type optical recording medium on which signal light is recorded as a hologram by placing a signal light region that generates signal light, and a reference light region that generates reference light, symmetrically to one another about an optical axis of coherent light by displaying, on a spatial light modulator that spatially modulates the incident coherent light, a pattern that divides a modulating region into 4n+2 regions, where n is a natural number greater than or equal to 1, and generating the signal light and reference light by modulating the incident coherent light by the spatial light modulator, and simultaneously and coaxially illuminating, onto the optical recording medium, the signal light and the reference light generated from the signal light region and the reference light region disposed symmetrically to one another;
displaying a reference light pattern at a same position as the reference light region at a time of hologram recording;
generating reference light for reading, by modulating coherent light by the spatial light modulator; and
playing-back the signal light by illuminating the generated reference light for reading onto the optical recording medium.

14. The hologram playback method of claim 13, wherein there are a plurality of a group of the signal light region and the reference light region that are disposed symmetrically to one another, and reference light for reading is generated per group, and generated reference light is illuminated onto the optical recording medium, and the signal light of each group is successively played-back from the optical recording medium.

15. A hologram playback method comprising:
providing a reflecting-type optical recording medium on which signal light is recorded as a hologram by placing a signal light region that generates signal light, and a reference light region that generates reference light, symmetrically to one another about an optical axis of coherent light by displaying, on a spatial light modulator that spatially modulates the incident coherent light, a pattern that divides a modulating region into 4n+2 regions, where n is a natural number greater than or equal to 1, and generating the signal light and reference light by modulating the incident coherent light by the spatial light modulator, and simultaneously and coaxially illuminating, onto the optical recording medium, the signal light and the reference light generated from the signal light region and the reference light region disposed symmetrically to one another;
displaying a reference light pattern at a position that is symmetrical, across an optical axis of the coherent light, to the reference light region at a time of hologram recording;
generating reference light for reading, by modulating coherent light by the spatial light modulator; and
playing-back the signal light by illuminating the generated reference light for reading onto the optical recording medium.

16. An optical recording medium adapted to recording signal light as a hologram by placing a signal light region that generates signal light, and a reference light region that generates reference light, symmetrically to one another about an optical axis of coherent light by displaying, on a spatial light modulator that spatially modulates the incident coherent light, a pattern that divides a modulating region into 4n+2 regions, where n is a natural number greater than or equal to 1, and generating the signal light and reference light by modulating the incident coherent light by the spatial light modulator, and simultaneously and coaxially illuminating, onto the reflecting-type optical recording medium, the signal light and the reference light generated from the signal light region and the reference light region disposed symmetrically to one another, the optical recording medium comprising:
a recording layer on which the hologram can be recorded by changes in a refractive index that correspond to a light intensity distribution;
a reflective layer that reflects the signal light and the reference light that have passed through the recording layer; and
a buffer layer that is provided between the recording layer and the reflective layer, and separates the recording layer and the reflecting layer so that respective beam waists of the incident signal light and the reference light are not positioned within the recording layer.

17. The optical recording medium of claim 16, wherein the buffer layer is structured of a material that is inactive with respect to the signal light and the reference light.

* * * * *